Nov. 8, 1938.  C. M. JAMESON  2,135,896
MEANS FOR PREVENTING THE BACK-ROLLING OF AUTOS
Filed April 11, 1932  2 Sheets-Sheet 1

INVENTOR.
Chas. M. Jameson

Nov. 8, 1938.  C. M. JAMESON  2,135,896
MEANS FOR PREVENTING THE BACK-ROLLING OF AUTOS
Filed April 11, 1932  2 Sheets-Sheet 2
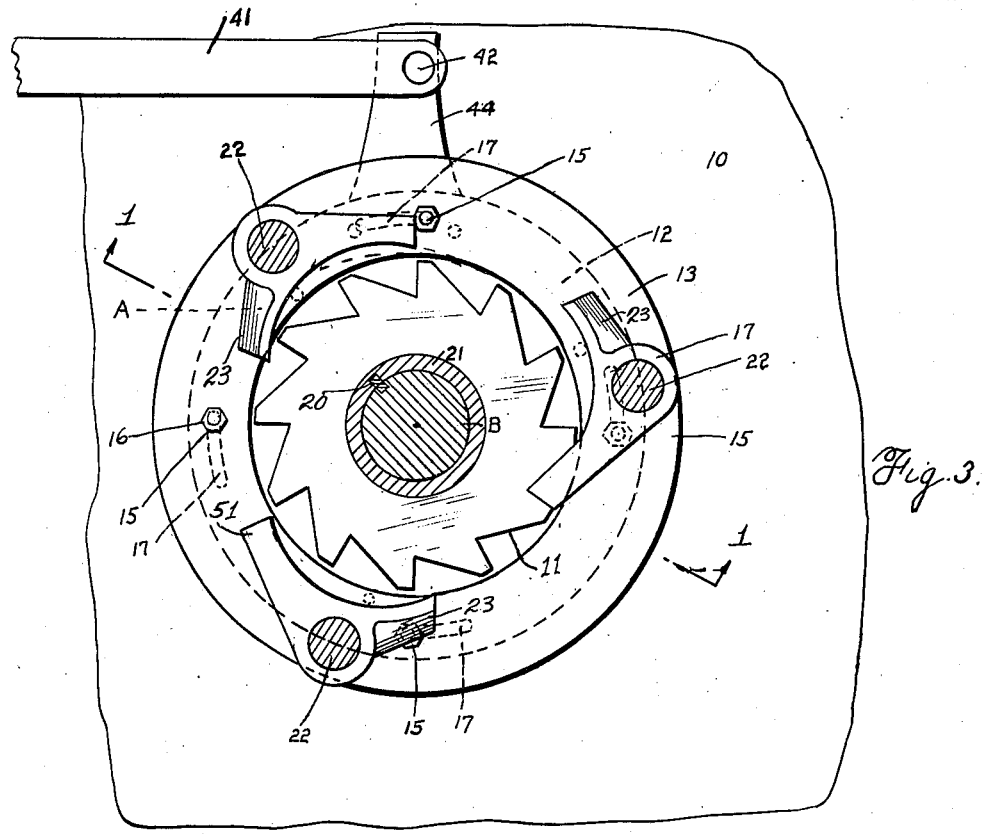
INVENTOR.
Chas. M. Jameson Patented Nov. 8, 1938

2,135,896

UNITED STATES PATENT OFFICE 2,135,896

MEANS FOR PREVENTING THE BACK-ROLLING OF AUTOS

Charles M. Jameson, Pasadena, Calif., assignor to Automotive Devices, Inc., a corporation of California Application April 11, 1932, Serial No. 604,401

5 Claims. (Cl. 192—4)

This invention relates to improvements in mechanism for stopping an automobile or similar vehicle when it is desired to cease movement of the machine for various causes.

One of the objects of this invention is to provide a simple, efficient and inexpensive device whereby, independently of the will of the operator the car may be quickly stopped, especially when it is necessary to prevent the back-rolling of the machine on a grade.

It is well known that when an automobile reaches the top of a sharp grade or hill, in placing the gear shift lever in neutral before the brakes are applied, or when moving the gear shift lever out of neutral to place it in first speed position, after the brakes have been released the car has a tendency under the force of gravity to roll backwardly down the hill, making it difficult to start the machine on its forward movement.

In a copending patent application, filed by me on the first day of February, 1932, bearing Serial Number 590,169, I have disclosed certain details of construction that have to do with preventing the back-rolling of the machine due to a releasing of brakes, where the stopping means is independent of the brake mechanism. In the present application I make use of the same instrumentalities as before but use in conjunction therewith certain parts by which the braking mechanism will be operated at the same time as the means controlled independently of the braking mechanism and which also stops the car.

A further object of the present invention is to provide means for stopping an automobile to prevent it rolling down a hill which is controlled automatically as the gear shift lever and clutch of an automobile is being operated. Should anything happen to the braking mechanism of the machine whereby it becomes impaired or out of order, the car will still be stopped automatically so as not to roll backwardly on the hill or grade.

A final purpose of this invention is to provide a dual control of the stopping mechanism for an automobile, whereby the usual brakes are employed for stopping the machine to prevent back-rolling thereof accidentally, whilst allowing back-rolling at the will of the operator, as when reversing the car on a grade, and whereby means, independent of the brakes are operated for the purpose of also stopping the car to prevent back-rolling thereof.

With the above and other objects in view, my invention consists in the combination, arrangement, and details of construction disclosed in the drawings, and specification, and then more particularly pointed out in the appended claims.

In the drawings, taken on line 1—1 of Fig. 3 wherein similar reference characters designate similar parts throughout the respective views, Figure 1 is a sectional elevation of the parts of my invention, Figure 2 is a top plan view of certain parts of my invention, Figure 3 is an end elevation of my invention, shown mounted upon a frame, and taken on line 3—3 of Fig. 1, Figure 4 is a side elevation of the carrier for the dogs that operate the ratchet wheel, forming part of my invention, Fig. 5 is a diagrammatic view of the parts of my invention shown in their positions after operation of my automatic means for applying the brake.

Fig. 6 is a similar diagrammatic view of the parts of Fig. 5 showing the parts in their normal positions before operation of my automatic means for applying the brake upon back-rolling.

Fig. 7 is a diagrammatic view of gear positions showing the transmission in forward gear and the device in operative condition.

Fig. 8 is a diagrammatic view of gear positions showing the transmission in reverse gear with the device in inoperative condition.

Fig. 9 is a diagrammatic view of gear positions showing the transmission in neutral gear following reverse, and the device in inoperative condition.

Figure 1:
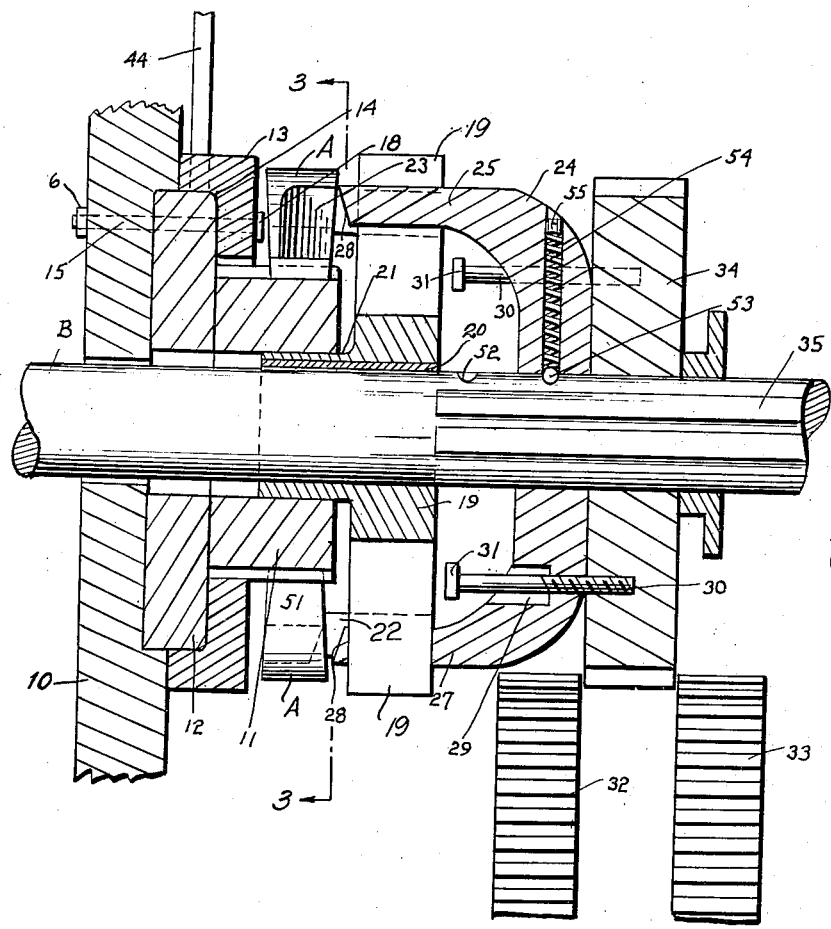

In the drawings, wherein similar reference characters designate similar parts thruout the respective views, and wherein the parts are merely illustrative of my invention the invention disclosed performs the function of stopping an automobile from rolling backwards on a grade. 10 designates any suitable frame on the car, and 11 is a ratchet wheel whose flange 12 is centered in relationship to a retaining ring 13. It is preferred to form the flange 12 upon the ratchet wheel, and to fit this flange into the rabbeted portion 14 of the retainer ring 13. I form a series of circumferentially spaced apart arcuate slots 17 in the retainer ring 13 as well as in the flange 12 of the ratchet wheel, and I cause a series of screw threaded bolts 15 to project thru these arcuate slots 17, so that their heads 18 bear against the retainer ring 13, and so that nuts 16 may be screwed home upon the screw threaded portions, to clamp the retainer ring and the flange of the ratchet wheel together loosely.

It will be seen that the hub 21 of a spider or dog carrier 19 is fixed upon the shaft B by means of the key 20 and extends rotatedly into the ratchet wheel 11, and carries the pivot pins 22 upon which the series of dogs A are eccentrically mounted for movement. Each dog has a stout claw of proper proportions 51, designed to come into engagement with the teeth of the ratchet wheel 11 under the proper conditions. The outer terminals of the dogs are respectively formed with beveled edges 23. 24 designates a shifter which consists of a disk like body having a series of right-angularly projecting arms 25, 26, and 27 formed integrally thereupon and designed to engage with the dogs A, in a manner about to be explained. The outer ends of the arms 25, 26, and 27 are also formed beveled at 28 for engagement with the beveled edges of the terminals of the respective dogs. Upon advancing the shifter 24 through a force applied against it by shiftable gear 34, the bevel 28 of the outer end of the shifter arms 25, 26 and 27 will engage the counter-bevelled edges 23 of dogs A thus raising the engaging ends 51 of the dogs out of engagement with teeth of ratchet wheel 11.

The shaft B is formed with a series of longitudinally extending spline ribs 35, designed to fit the correspondingly shaped recesses 45 of the bore of the shifter 24 as shown in Figure 4. It will be observed that the shifter is provided with a series of sockets 29 of a diameter larger than the diameters of a series of screw threaded bolts, 30 whose heads are designated 31. The two standard gears 32, and 33 of the usual transmission train of an automobile are shown, operating in conjunction with the shiftable gear 34 which is splined upon the ribs 35 of the shaft B so as to slide thereon and rotate therewith. 36 designates the usual gear shift lever the handle of which is designated 37. The usual gear box 38 is also disclosed and the gear case 39. This gear case is formed with the elongated slot 40 in which is slidably mounted the crank arm 44 which is operatively attached to the flange 12 of the ratchet wheel 11, the movement of the ratchet wheel communicating power and action to the crank arm 44.

Figure 2:
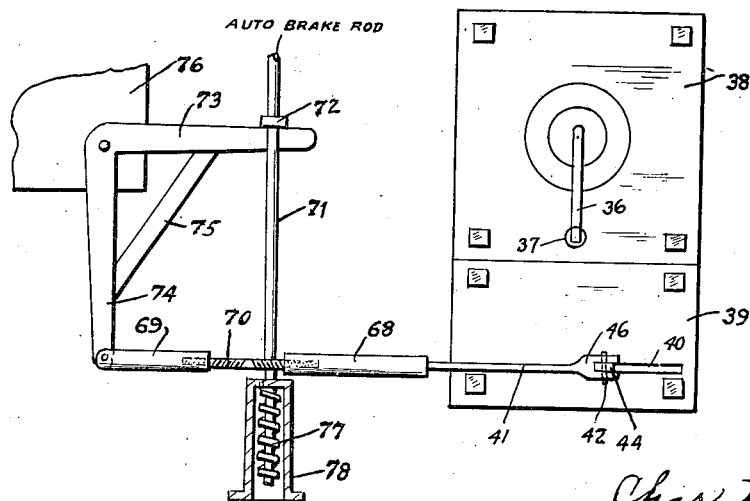

The crank arm 44 carries a crank pin 42 upon which is pivoted the connecting rod rocker link 41 formed at its inner end with a fork 46 through which the crank pin 42 passes. A sleeve 68 is carried by the rocker link 41, and into its other end the right handed threads of a turnbuckle 70 are received, the other end of this turnbuckle having left handed threads which also screw home into the sleeve 69. The latter is pivotally attached to one arm 74 of a bell-crank lever, the other and right angular arm of which, 73, reacts against the shoulder or nut 72 fixedly mounted upon the usual rod 71 that operates the brake mechanism of an automobile. A brace arm 75 connects the arms 73, and 74 of the bell-crank lever for reinforcing purposes, this lever being pivoted upon any desirable support 76. A spring 77 is operatively coiled around the rod 71 being associated in connection with a stand 78 as shown in Figure 2. As illustrated in Fig. 2, an upward movement of rod 71 applies the brakes. The shaft B is formed with two or more nicks 52 upon its face into any of which the ratchet ball 53 may be pressed by a spring 54 suitably housed in the shifter 24, the spring being confined in the latter member by any means such as the screw plug 55.

In operation the ratchet wheel and associated parts function in the identically same manner as described in my co-pending application filed on first day of February, 1932, and bearing Serial Number 590,169. However, due to the formation of the arcuate shaped recesses or slots 17, the ratchet wheel is allowed a slight movement determined by the distance that the securing bolts 15 allow. Normally, when the automobile is in action in any of its forward speeds, the centrifugal force set up would disengage the dogs A from the teeth of the ratchet wheel, as the forward movement of the car prevents the hazard of back-rolling thereof. But when the speed of the machine slackens materially to a slow run, the dogs engage the ratchet wheel, and if the brakes are off, and the car tries to roll back, the back movement will momentarily carry the ratchet wheel along with it, and the ratchet wheel rotates the distance of the length of the arcuate slots 17, and no more. The wheel 11 then comes to a stop. This occuring the crank arm 44 moves with the ratchet wheel a sufficient distance to move the rocker link 41 and turnbuckle connections in the right direction, to cause the arm 73 of this lever to actuate the brake mechanism by means of the brake rod 71, from positions as shown in Fig. 6 into those shown in Fig. 5, and the dogs which have thus caused the ratchet wheel to move will now remain at rest against the teeth of the ratchet wheel, since the latter is at rest so the car is held by virtue of the operation of the brake mechanism as well as by means of the interengagement of the dogs with the teeth of the ratchet wheel. When the shifter arms move to engage the dogs to retract the latter, the beveled ends 28 of these shifter arms engage the beveled ends 23 of the dogs so by allowing the arms to ride over the beveled ends of the dogs these ends of these dogs are depressed and the claws thereof are raised out of engagement with the ratchet wheel.

When now the gear shift lever 36 is operated to place the gears in low speed position, the parts will be as shown in the diagram illustrated in Figures 4 and 7, and the shiftable gear 34 has moved in the position shown there being play between the shifter 24 and this gear as the screw rods 30 are extended during this idle interval, without disturbing the position of the other parts, so the dogs still hold upon the stationary ratchet wheel and the brake mechanism is still in operation, being so indicated in Figure 5.

When, upon authorizing rearward movement of the automobile, the shiftable gear is moved into reverse position as shown in Figure 8, it comes into contact with the shifter 24 in its position of Figure 7 and it bodily forces this shifter towards the left which causes the arms thereof and especially the beveled edges 28 of these arms to ride against the beveled edges 23 of the dogs, and thereupon the terminals of the dogs are tipped and the claws thereof disengaged from the teeth of the ratchet wheel, and now the dogs no longer hold the car against back rolling, and as this takes place the crank arm 44 is restored to normal position in its slot 40, so the brake mechanism is released. The car may now be reversed without interference either from the dogs or from the usual braking mechanism which have been automatically operated up to this time. If, whilst reversing, the operator wants to roll back hill faster and not depend upon his slowness in reversing, he may shift the shiftable gear 34 back from the shifter 24 into neutral position as shown in Figure 9 and this action will not disturb the released condition of the dogs, as the shifter will not move in unison with the reverse movement of the gear. If, however, the operator shifts gears into forward low gear position, as shown in Fig. 7, the gear 34 moves to the right and through bolts 30 pulls shifter 24 away from the dogs permitting the dogs to again engage the ratchet when the car comes to a slow speed. Thus, the ratchet and dog mechanism is in condition for preventing unauthorized rearward movement of the vehicle only when the transmission is in a forward speed or in neutral following a forward speed. When the transmission is in reverse or in neutral following reverse gear, the mechanism is not in condition to prevent back-rolling of the car. In this manner it is seen that complete control is given to the operator of the car of the mechanism for stopping the car from back-rolling.

I do not mean to limit myself to the exact details of construction herein set forth but cover all variations falling within the purview of the appended claims.

What I desire to claim and secure by Letters Patent is:—

1. In a device as described, the combination of an auto brake mechanism, a ratchet wheel capable of undergoing a limited rotation, dogs associated with said ratchet wheel and designed to engage the same, a gear shift lever, a rotary member actuated when the auto gear shift lever is set for forward speed or in neutral position following any forward speed and during a slight back rolling to cause the dogs to actuate the ratchet wheel in rotary movement, and means operated by the ratchet wheel as it moves for automatically applying the brake mechanism.

2. In an automobile, the combination of a brake mechanism, a transmission shaft, a ratchet wheel on said shaft having a limited rotary movement thereon, but otherwise being rigidly unrotatedly positioned, dogs engageable, during slow speed of the auto, with said ratchet wheel, a carrier for said dogs connected for rotation with the transmission shaft, designed to actuate said dogs to turn the ratchet wheel when the auto rolls back, and means controlled by said wheel for applying the brake mechanism.

3. In an automobile equipped with brakes and having a transmission and a transmission shaft, the combination of a ratchet, dogs engageable with said ratchet, a carrier for said dogs moved by said transmission shaft independent of the setting of said transmission, said dogs cooperating with said ratchet to move said ratchet upon unauthorized rearward movement of said automobile, and means in connection with said ratchet controlled by movement of said ratchet for applying the brakes.

4. In an automobile, the combination of brakes, a transmission shaft, means for automatically applying the brakes upon rearward movement of the automobile comprising a ratchet wheel concentric with said transmission shaft, dogs engageable with said ratchet wheel, a carrier for said dogs connected for rotation with said transmission shaft, said dogs adapted to cooperate with said ratchet wheel to move said ratchet wheel upon rearward movement of the automobile, an operative connection between said ratchet wheel and said brakes for applying the brakes when the ratchet wheel is moved, and additional means adapted upon authorizing rearward movement of the automobile to lift and hold said dogs out of engagement with said ratchet wheel.

5. In an automobile, the combination of brakes, a transmission having forward, neutral, and reverse positions, a transmission shaft, means for automatically applying the brakes upon rearward movement of the automobile comprising a ratchet, dogs engageable with said ratchet, a carrier for said dogs moved by said transmission shaft, said dogs adapted to cooperate with said ratchet to move said ratchet upon rearward movement of the automobile, an operative connection between said ratchet and said brakes for applying the brakes when the ratchet is moved, and additional means adapted to render inoperative said first means when said transmission is in reverse position or in neutral position following reverse.

CHAS. M. JAMESON.